United States Patent [19]

Blount

[11] 4,365,580
[45] Dec. 28, 1982

[54] HULL CONSTRUCTION

[76] Inventor: Luther H. Blount, 1 Shipyard La., Warren, R.I. 02885

[21] Appl. No.: 254,585

[22] Filed: Apr. 13, 1981

[51] Int. Cl.³ .............................................. B63B 5/24
[52] U.S. Cl. .................................. 114/356; 114/357; 114/359
[58] Field of Search ............... 9/6 P, 6 M, 6 R, 310 E, 9/310 R; 114/39, 355–358, 360, 67 R, 69, 359, 61, 123, 263, 267; 441/65, 74

[56] References Cited

U.S. PATENT DOCUMENTS

| 3,195,154 | 7/1965 | Swanson | 9/6 P |
| 3,680,516 | 8/1972 | Loverdos-Stelakatos | 114/67 R |
| 3,831,212 | 8/1974 | Moore et al. | 9/6 R |
| 3,902,443 | 9/1975 | McDougall | 114/39 |
| 3,943,586 | 3/1976 | Palmer | 9/6 M |
| 4,118,814 | 10/1978 | Holtom | 9/6 P |
| 4,161,796 | 7/1979 | Kostanecki | 9/6 P |

FOREIGN PATENT DOCUMENTS

| 2527868 | 1/1977 | Fed. Rep. of Germany | 9/6 P |
| 2068336 | 8/1971 | France | 114/357 |

Primary Examiner—Sherman D. Basinger
Assistant Examiner—Stephen P. Avila
Attorney, Agent, or Firm—Salter & Michaelson

[57] ABSTRACT

A composite hull construction for boats and the like is disclosed. A rigid inner box-like structure of steel or aluminum is provided and acts as the main structural element of the hull, a rigid synthetic foam core being intimately bonded to the exterior surfaces thereof. The exterior surface of the foam material is easily formed as desired to define the outer configuration of the hull and a layer of resin impregnated glass fibers is layed-up over the foam to provide a protective outer skin for the hull.

17 Claims, 4 Drawing Figures

HULL CONSTRUCTION

BACKGROUND OF THE INVENTION

The instant invention relates to a hull construction for boats and the like and more particularly to a novel composite type hull construction.

Over the years steel hull constructions have proven to be extremely strong and durable and as a result virtually all of the very large vessels currently in use are made of steel. The most common type of hull construction for steel vessels incorporates a plurality of transverse steel ribs therein which are joined together with a plurality of longitudinal elements and stringers. This framework is covered with a shell of sheet steel to provide an outer hull for the vessel. Thereafter decking, interior compartments, bulkheads and superstructure are added to adapt the particular vessel for its intended service. Steel vessels of this general type derive their overall structural rigidity from the cooperation of the framework, the outer shell, the decking and the interior compartments and bulkheads. The structural relationships between these elements are well known and have heretofore been represented by mathamatical formulas which are widely used in naval architectural design. Unfortunately, however, while vessels constructed in this manner are very strong, they are also very heavy and the steel tends to rust and corrode rather quickly unless it is well coated and protected. For these and other reasons, the use of steel as a construction material for boat hulls has heretofore primarily been restricted to vessels of greater than 50 feet in length.

On the other hand, fiberglass hull constructions have in recent years proven to be extremely effective for smaller boats for both commercial and non-commercial applications. Fiberglass is a particularly desirable construction material because it is strong, durable, corrosion resistant and can be molded to virtually any shape. Traditional fiberglass hull constructions have generally included the laying-up of a number of layers of resin impregnated glass fibers into a preformed female mold. In this manner a laminate of a number of layers of glass fibers is formed to the precise configuration desired for the hull of the boat. Additional structural elements or stiffeners as well as decking and superstructure may thereafter be added to adapt each boat for its particular application. However, since in this type of construction the fiberglass shell or hull itself provides the primary structural rigidity for the vessel, as the size of the vessel or boat is increased, the number of layers or fiberglass necessary to obtain the desired structural rigidity must also be increased with the stiffeners, decking and bulkheads requiring similar reinforcing. While this is not of major concern in hull constructions for vessels of up to approximately 40 feet in length, it is of greater significance in boats in the range of between 50 and 70 feet resulting in disproportional increases in vessel weight. Furthermore, since boats of this general type are formed by laying up resin impregnated glass fibers into a female mold, as the size of the boat is increased, the associated problems related to the building, handling and moving of the mold as well as those related to the removal of the completed hull from the mold, become of greater significance. Consequently, while fiberglass boats of 100 feet or more in length have heretofore been made, for practical reasons, fiberglass hull constructions are really limited to boats of less than 65 feet in length.

The instant invention is directed to a novel hull construction which combines many of the advantages of fiberglass boats with those of steel boats. While the hull construction of the instant invention is adaptable for use on virtually any size vessel, it is particularly well suited for intermediate size boats in the range of between 40 and 120 feet in length.

The hull construction of the instant invention includes a rigid inner box-like structure which may be made of steel, aluminum or any other suitable rigid material. A rigid synthetic foam material is applied over the inner box-like structure and is formed to substantially the desired configuration of the hull. An outer layer of the resin impregnated glass fibers is layed-up over the foam material providing an outer skin or shell for the hull. In this manner a sandwich type composite hull is constructed which derives its structural rigidity primarily from the inner box-like structure and derives its outer configuration primarily from the foam material. The fiberglass shell merely provides a protective skin for the foam material.

Sandwich type hull constructions have heretofore been available wherein a synthetic foam material is sandwiched between inner and outer shells and examples of this type of hull construction representing the closest prior art of which the applicant is aware are illustrated in the following U.S. Pat. Nos.: Fisher, 3,013,922; Kohrn et al., 3,070,817; Hegg, 3,531,809; Geiger, 3,634,898; Bibb, 3,749,594; Moore et al., 3,831,212; Stoeberl, 3,811,141; Stoeberl, 3,840,926; Myers et al., 3,911,190; Alter et al., 4,021,874; Hoppe et al., 4,099,280; Holtom, 4,118,814; and Kostanecki, 4,161,796.

While there is obviously a considerable amount of prior art in the field of sandwich-type hull constructions, none of the hull constructions heretofore known have included the use of an inner box-like structure as the primary structural element of the hull. Thus, the instant invention is unique in that it combines the structural advantages of a steel hull construction with the practical advantages of a non-corrosive fiberglass outer hull in a sandwich type construction. The hull construction herein disclosed is both lighter and less expensive to manufacture than the hull constructions heretofore known. Consequently, the instant invention represents a substantial improvement in the art of sandwich-type hull construction and has significant commercial value as a result of substantial reductions in both hull construction costs and vessel operating costs.

SUMMARY OF THE INVENTION

The instant invention relates to a composite-type hull construction for boats and the like and more particularly to a novel composite type hull construction wherein the structural advantages of metal hulls are combined with the advantages of durability and corrosion resistance of fiberglass hulls. The hull construction of the instant invention includes a metallic inner box-like structure which acts as the main structural element of the vessel. The box-like structure normally includes metallic side walls and a bottom wall but also may include longitudinal and transverse structural members or bulkheads as well as various inner watertight compartments, transverse watertight bulkheads and watertight decking extending over the entire or partial hull. A synthetic foam material is intimately bonded to the exterior of the inner box-like structure and conforms substantially to the desired outer configuration of the hull. One or more layers of resin impregnated glass fibers or other synthetic material are intimately bonded to the exterior surface of the foam material to provide an outer shell or skin for the hull which protects the foam material. The hull derives its structural rigidity primarily from the inner box-like structure and derives its outer configuration primarily from the foam material. Consequently, the box-like structure can be formed in more or less any convenient shape, and the construction thereof does not require the sophisticated techniques normally utilized to provide compound curved surfaces in conventional steel boats. Instead, the compound curves are easily formed in the foam material prior to applying the resin impregnated glass fiber outer skin. While the metal inner box and the fiberglass outer skin obviously have different thermal expansion characteristics the foam material by nature has sufficient elasticity to compensate for any differential in thermal expansion without creating structural problems in the completed hull. Furthermore, since the foam material occupies a significant volume between the inner and outer hulls, it also functions as a floatation material rendering hulls constructed in accordance with the subject invention virtually unsinkable.

As hereinbefore stated, the hull construction of the instant invention is particularly well suited for use in boats of between approximately 40 and 120 feet in length. The method herein disclosed is an effective means of constructing vessels of this general size which are easily as strong as steel or fiberglass boats of comparable size but can be manufactured for approximately two-thirds of the cost. Furthermore, boats constructed in accordance herewith are substantially lighter than comparably sized vessels of conventional construction and are therefore substantially more efficient to operate.

Accordingly it is an object of the instant invention to provide a hull construction for boats and the like which combines the structural advantages of steel hull constructions with the advantages of durability and corrosion resistance of fiberglass hull constructions.

Another object of the instant invention is to provide an economical means of incorporating compound curves into a boat having a steel skeletal structure.

Still another object of the instant invention is to provide an economical hull construction for intermediate sized vessels.

Still another object is to teach a method of constructing a hull for a marine vessel that includes forming an interior skeletal metal base, bonding a foam material to the metal base and applying a fiberglass outer skin to the foam material.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
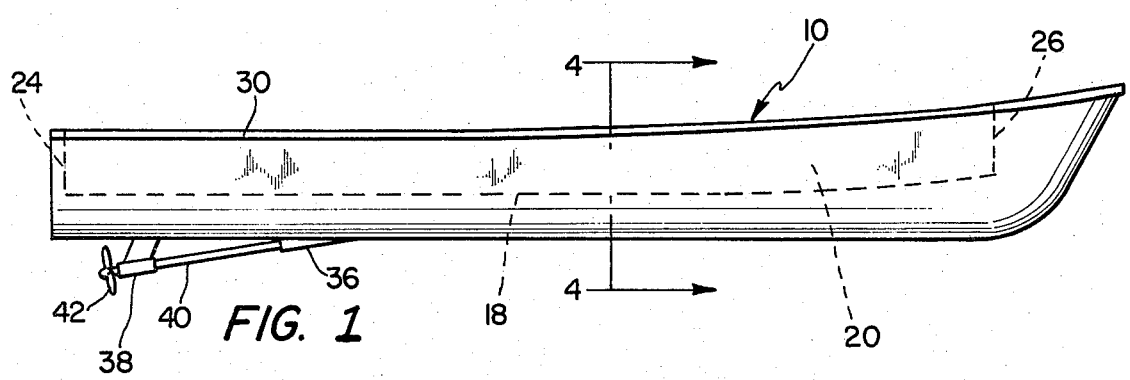
FIG. 1 is a side elevational view of a boat hull constructed in accordance with the instant invention.
Figure 2:
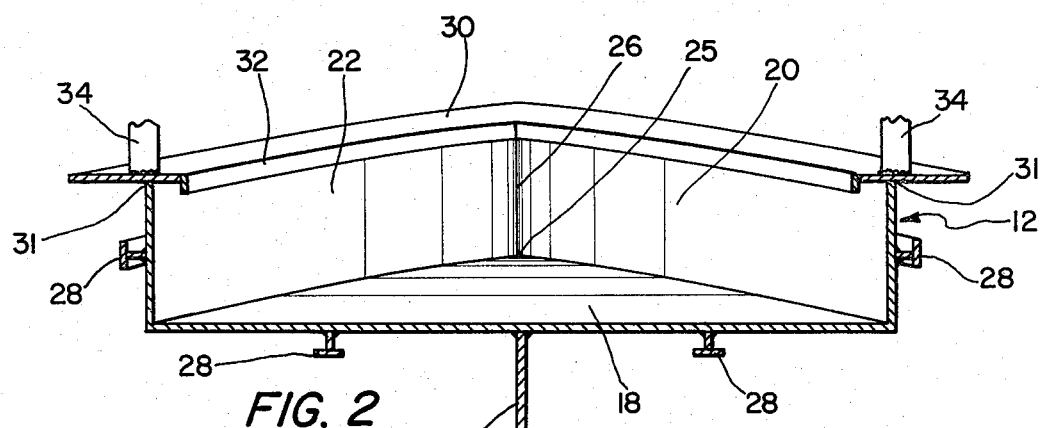
FIG. 2 is a vertical sectional view of the metal inner box-like structure of the boat hull of the instant invention prior to applying the foam material thereto.
Figure 4:
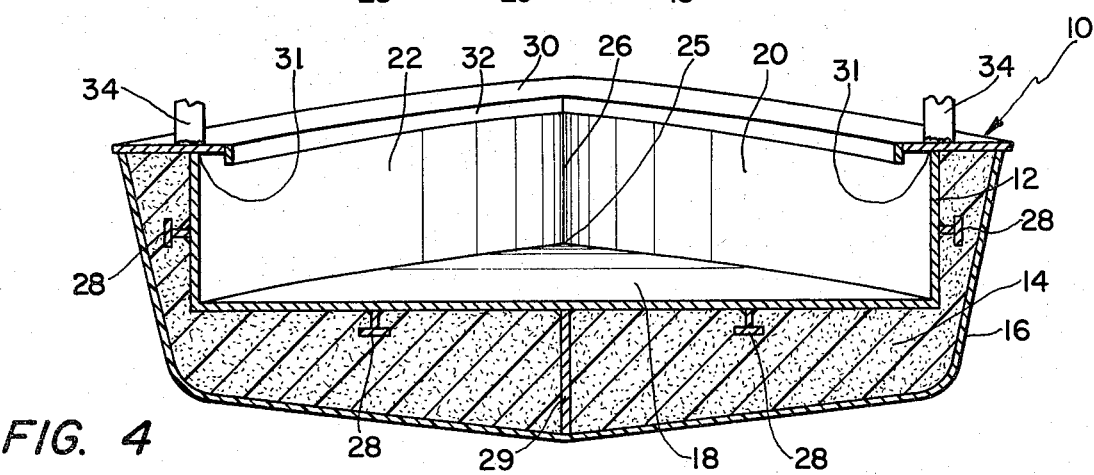
FIG. 4 is a sectional view taken along line 4—4 in FIG. 1 and illustrating the completed hull construction after the fiberglass outer shell has been applied to the foam core.

Referring now to the drawing, the finished hull construction of the instant invention is illustrated in FIGS. 1 and 4 and is generally indicated at 10. As will be noted, the hull 10 comprises an inner box-like structure generally indicated at 12, a foam core 14 which is intimately adhered to the outer surfaces of the inner box-like structure 12 and an outer shell or skin 16 which is intimately adhered to the outer surfaces of the core 14. The box-like structure 12 which is particularly illustrated in FIG. 2 is preferably constructed of steel or aluminum and defines a skeletal frame for the hull 10, functioning as the primary source of strength and rigidity therefor. The box-like structure 12 illustrated includes a bottom wall 18, side walls 20 and 22 and a rear wall or inner transom 24 upstanding therefrom. The bottom wall 18 as will be noted is tapered at the fore end of the hull 10 to form an apex 25, whereby the substantially vertical upstanding walls 20 and 22 join to define a substantially vertical fore end 25 of the inner structure 12. A plurality of T-shaped longitudinal members 28 are secured to the outer surfaces of the walls 18, 20 and 22, and a substantially vertical keel 29 projects downwardly from the bottom wall 18 and extends substantially along the longitudinal center line of the inner box-like structure 12. A substantially horizontal covering plate or peripheral deck member 30 having an inner flange 32 is secured to the upper edges of the walls 20 and 22 and to the inner transom 24 at 31 and extends both inwardly and outwardly therefrom. A plurality of superstructure brackets 34 are attached to the deck member 30 and extend upwardly to provide means for securing superstructure to the hull 10 as desired. A shaft log 36 and a strut 38 extend downwardly from the bottom of the hull 10 adjacent to the aft end thereof and support a shaft 40 and a propellor 42 which provide the means for propelling the vessel.

While the particular hull construction herein disclosed is that of an open launch type power vessel, it is understood that the hull construction of the instant invention is equally well suited for vessels of other configurations including both power and sailboats of various sizes. Furthermore, while the inner box-like structure 12 as hereinabove described is basically an open structure having a bottom wall, side walls and an end wall or inner transom, other variations of the structure are contemplated and could comprise a completely decked-over inner box-like structure having one or more inner bulkheads and/or compartments. Further, the longitudinal members 28 could be virtually any suitable configuration, and additional longitudinal members or stringers as well as transverse members could be provided as necessary. It is obvious that by adding further structural members, bulkheads, compartments or decking, the overall structural rigidity of the entire skeletal structure is increased. The precise configuration, number and gauge of the various structural elements required in any particular application are determined by well-known formulas widely used in naval architecture for hull design.

As hereinbefore stated, the box-like structure 12 functions primarily as the skeletal structure of the hull 10 and does not substantially determine the exterior configuration thereof. Accordingly, the structure 12 may be formed, within limits, in virtually any convenient configuration. Preferably, the elements of the structure 12 need not include any of the compound curves normally associated with traditional boat hull constructions and consequently the structure 12 is comparatively simple to fabricate.

Figure 3:
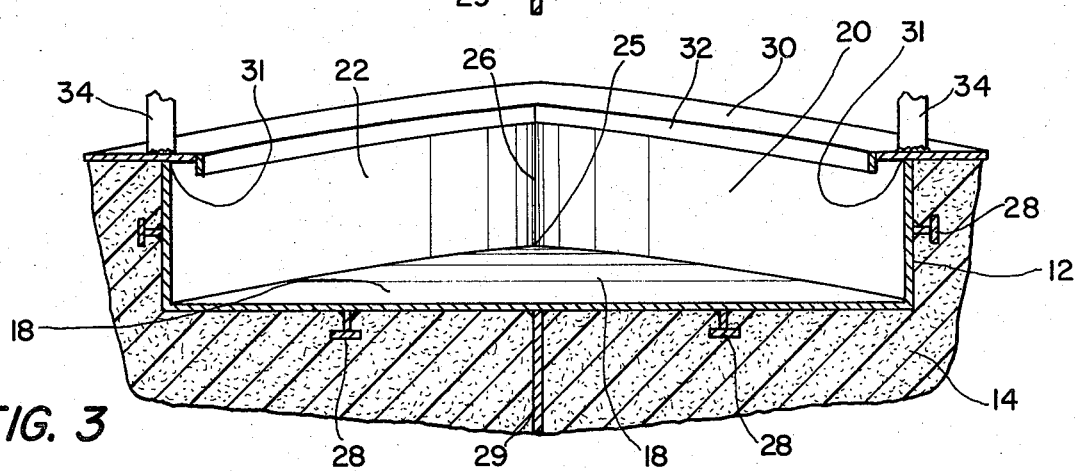
FIG. 3 is a view similar to FIG. 2 subsequent to applying the foam material to the box-like structure.

The foam core 14 preferably comprises a synthetic foam material such as polyurethane, although other suitable synthetic foam materials may be employed as desired. In practicing the method for constructing the hull 10, the foam core is applied to the exterior of the structure 12 subsequent to the completion of all of the welding operations. In this connection the foam material is applied to the structure 12 in a semi-liquid state and is intimately bonded to the exterior surfaces of the walls 18, 20 and 22, the transom 24, the longitudinal members 28, the keel 29 and the lower outer surfaces of the peripheral deck 30. Preferably the foam material is sprayed onto the structure 12 in a manner well-known in the art and is applied in substantial amounts to essentially form the desired exterior configuration of the hull 10 as illustrated in FIG. 3. In this manner the foam core 14 acts as a convenient and simple means of forming compound curves in the outer configuration of the hull 10. Subsequent to the curing of the foam material, further forming steps may be carried out as needed by any one of a number of well-known forming methods such as by the use of a hot wire to cut and shape the foam material. It is also seen that since the foam core 14 occupies a considerable volume in the hull 10, it acts as a floatation material and hulls are constructed in accordance with the subject invention are virtually unsinkable. Furthermore while in the hull construction herein disclosed, the foam core 14 is formed generally in the configuration of a substantially flat bottomed boat having substantially round or soft chines, it may be formed in virtually any other configuration desired.

Although various suitable materials are available for the outer skin 16, it is preferably formed of resin-impregnated glass fibers which are laminated to provide a protective outer shell for the foam core 14. Preferably the resin-impregnated glass fibers are layed-up by conventional methods in a series of well-known steps. Since, however, the skin 16 does not function as a primary structural element of the hull 10, it may be of substantially less thickness than would normally be necessary for a conventional fiberglass vessel of comparable size. Subsequent to the curing of the skin 16, the exterior surfaces thereof may be further finished to provide a smooth outer surface for the hull 10, and thereafter anti-fouling paints or other paints may be applied as needed or desired.

The hull construction of the instant invention is therefore a novel means of providing a virtually unsinkable composite hull which is both structually sound and economical to manufacture. It is also seen that substantial costs savings in manufacturing are realized as a result of the less sophisticated construction techniques required to form the desired outer configuration of the hull. While traditional steel hull constructions for vessels of comparable size require highly skilled labor and more complex construction techniques in their manufacture, the hull construction of the instant invention can be fabricated with a minimum of difficulty by relatively unskilled labor.

Furthermore, hulls constructed in accordance herewith are substantially lighter in weight than comparably sizes hulls of steel or aluminum. Traditional design considerations for steel or aluminum hulls have included the oversizing of the metallic structural elements thereof mainly to compensate for the corrosion which inevitably takes place over the years, particularly in salt water service. In the hull construction of the instant invention none of the metallic structural elements are directly exposed to the water and consequently they are substantially less susceptible to corrosion. All of the exterior surfaces of the structure 12 are completely coated with the foam material and hence they are effectively shielded from the corrosive effects of water. Consequently, substantially less consideration need be given to the oversizing of the structural elements of the hull to provide a durable hull construction. This factor along with the fact that the overall metallic box-like structure is somewhat smaller in size than the metallic structure of a comparable steel or aluminum vessel results in making the boat hulls constructed in accordance herewith considerably lighter in weight than those manufactured by conventional techniques. This results in substantial increases in the efficiency of operation for both power and sailing vessels constructed in accordance herewith. In particular, comparable power boats can operate with substantially smaller power plants resulting in greatly improved fuel economy.

It is seen therefore that the hull construction of the instant invention is an effective and efficient means for providing structurally sound unsinkable hulls for boats and the like which are both economical to manufacture and to operate. The instant invention is a significant improvement in the art which it is anticipated will have substantial commercial advantages over the boat constructions known heretofore.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A hull construction for a marine vessel and the like comprising:
    (a) a metallic inner hull structure of box-like configuration having an elongated bottom wall and upstanding side walls, said inner hull structure being of sufficient rigidity to provide substantially the sole load bearing supporting skeletal structure for said hull construction and defining an inner area in said vessel for receiving a cargo and the like;
    (b) a rigid synthetic foam core which is adhered to the outer surfaces of said inner hull structure and thereby encases said inner hull structure, the outer surfaces of said core substantially defining an outer configuration of said hull construction; and
    (c) outer skin means adhered to the outer surfaces of said core, said skin means substantially covering the outer surfaces of said core to provide a protective covering therefore but not providing structural support necessary to maintain the structural rigidity of said hull construction.

2. The hull construction of claim 1, further comprising a plurality of longitudinal members secured to the outer surfaces of said inner structure to increase the rigidity thereof.

3. The hull construction of claim 1, further comprising deck means secured to the upper periphery of said inner structure.

4. The hull construction of claim 3, further comprising super structure securing means attached to said deck means.

5. In the hull construction of claim 1, said outer skin means being further characterized as comprising a resin impregnated glass fiber outer shell.

6. In the hull construction of claim 1, said synthetic foam core being polyurethane foam.

7. In the hull construction of claim 1, said metallic inner hull being aluminum.

8. In the hull construction of claim 1, said metallic inner hull being steel.

9. In the hull construction of claim 1 said inner hull structure being substantially free of compound curves.

10. A method of constructing a hull for a marine vessel and the like comprising:
   (a) forming a metallic inner hull structure of box-like configuration having an enlongated bottom wall and upstanding side walls, said inner hull structure being of sufficient rigidity to provide substantially the sole load bearing supporting skeletal structure for said hull construction and defining an inner area in said vessel for receiving a cargo and the like;
   (b) applying an uncured hardening-type synthetic foam material to the outer surface of said inner hull structure to thereby encase said inner hull structure in a foam core;
   (c) allowing said foam core to cure;
   (d) forming said core to define an outer configuration of said hull; and
   (e) applying an outer skin to said core, said skin substantially covering said core and providing a protective outer covering therefor but not providing structural support necessary to maintain the structural rigidity of said hull construction.

11. The method of claim 10, further comprising the step of securing a plurality of longitudinal members to the outer surface of said inner hull prior to applying said foam material thereto.

12. The method of claim 10, further comprising the step of securing a deck to the upper edges of said box-like structure prior to applying said core.

13. The method of claim 12, further comprising the step of attaching a plurality of super structure brackets to said deck prior to applying said core.

14. The method of claim 10, said inner hull being of aluminum.

15. In the method of claim 10, said core being polyurethane.

16. In the method of claim 10, said skin being a resin impregnated glass fiber skin.

17. In the method of claim 10, said inner hull structure further characterized as being substantially free of compound curves.

* * * * *